Figure 1:
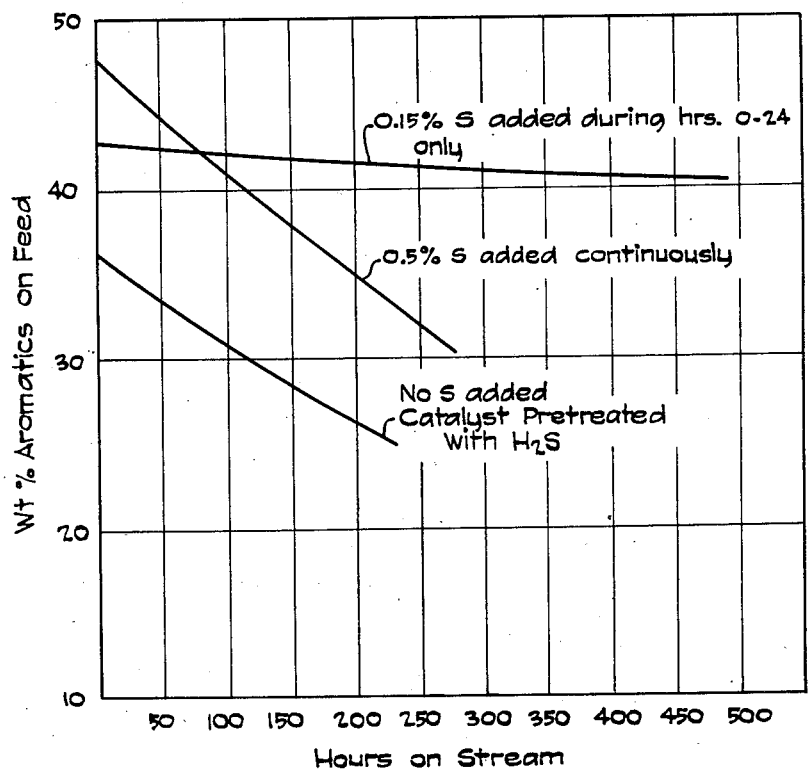

Inventor: Richard A. Bannerot
By his Attorney C.J. Ott

Patented July 22, 1952

2,604,438

UNITED STATES PATENT OFFICE 2,604,438

CATALYTIC DEHYDROGENATION OF HYDROCARBON OILS

Richard A. Bannerot, Long Beach, Calif., assignor to Shell Development Company, San Francisco, Calif., a corporation of Delaware Application May 23, 1949, Serial No. 94,846

5 Claims. (Cl. 196—78)

This invention relates to the catalytic dehydrogenation of hydrocarbon oils, and particularly to the dehydrogenation of sulfur bearing, normally liquid hydrocarbon oils such as the various hydrocarbon oils and fractions thereof obtained from or derived from petroleum, oil sands, oil shale, coal and the like. Specifically, the present invention relates to an improvement in the treatment of hydrocarbon oils with a metal oxide dehydrogenation catalyst in the presence of recycled product gas rich in hydrogen under conditions affording a net production of hydrogen. Processes of this specific type are often referred to as "hydroforming." The present invention, therefore, relates to an improvement in hydroforming.

In the treatment of hydrocarbon oils with metal oxide dehydrogenation catalyst in the presence of hydrogen under dehydrogenation conditions affording a net production of hydrogen, the metal oxide catalyst loses its activity at a fairly rapid rate and it is, therefore, necessary to subject the catalyst to a periodic regeneration treatment. The regeneration of the catalyst, as commonly carried out, involves the steps: (1) flushing the bed of catalyst of hydrocarbon vapors and hydrogen, (2) adjusting the temperature of the catalyst bed, (3) oxidizing the catalyst with a stream of gas containing a low and controlled concentration of oxygen under carefully controlled temperature conditions, (4) flushing the catalyst of oxygen and (5) adjusting the temperature of the catalyst bed to the desired operating temperature. This operation is relatively time-consuming and costly. The economy of the process is largely dependent upon the ratio of the onstream period (process period) to the regeneration period. It is, therefore, desirable to maintain this ratio as high as possible by extending the process period as much as practical, consistent with a suitable conversion. An object of the present invention is to provide a manner of operation wherein this ratio may be considerably increased with a resulting material improvement in the economy of the process.

In the dehydrogenation of the hydrocarbons with metal oxide dehydrogenation catalyst it is known that in many cases the presence of a small amount of sulfur in the feed has a beneficial effect known as the Varga effect (see U. S. Patents No. 1,852,988 and 1,894,926). On the other hand, larger amounts of sulfur in the feed have shown a detrimental effect and have been considered undesirable. Thus, when treating a hydrocarbon oil which normally contains no sulfur, or only insignificant amounts of sulfur, e. g., pure methyl cyclohexane, it has frequently been the practice to add a small amount of sulfur to the feed. Hydrogen sulfide is the sulfur compound usually recommended; however, other sulfur compounds are largely decomposed to hydrogen sulfide in the reaction zone under the prevailing conditions and are usually considered to be equivalent. On the other hand, most hydrocarbon oils from various natural sources, such as petroleum, oil sand, oil shale, coal and the like, normally contain more sulfur impurities than required to give the Varga effect and when treating such materials it is sometimes recommended to remove part of the sulfur. The removal of the sulfur impurities prior to the treatment is, however, usually too difficult and costly. However, in such cases it is frequently the practice to decrease the sulfur concentration in the feed to the reaction zone by scrubbing hydrogen sulfide from the recycled product gas. Thus, in the known method of operation of processes of the particular type in question it has been the practice to either add hydrogen sulfide or another sulfur compound to the feed when the feed normally contains insufficient amounts of sulfur, or to remove hydrogen sulfide from the recycled product gas when the feed normally contains appreciable amounts of sulfur.

According to this invention the catalytic dehydrogenation of normally liquid hydrocarbon oils in the presence of a substantial partial pressure of hydrogen with a metal oxide dehydrogenation catalyst is improved by adding a reducible sulfur compound to the hydrocarbon oil feed while simultaneously removing hydrogen sulfide from the product gas recycled to the reaction zone to maintain the desired partial pressure of hydrogen. It is well known that reducible sulfur compounds are largely converted to hydrogen sulfide in the reaction zone under the prevailing conditions. While it may, therefore, appear to be paradoxical to add sulfur to the feed while simultaneously removing sulfur from the recycled gas, it is, nevertheless, found that this allows the process period to be considerably lengthened, thereby considerably increasing the ratio of the process period to the regeneration period. While the reason for this improvement is not completely known, certain experiments which tend to throw some light on the matter indicate that the improvement is due to the fact that the added reducible sulfur compound has an effect upon the catalyst which is different than that of hydrogen sulfide, and that by adding the reducible sulfur compound while simultaneously removing hydrogen sulfide this difference is accentuated. These experiments, some of which are described below, indicate that when operating in the described manner undesirable side reactions are repressed and at the same time poisoning of the dehydrogenating activity of the catalyst is decreased. While this explains the improvement, it is to be understood that other factors may be involved and that the invention is not dependent upon the correctness of this explanation.

In a preferred embodiment of the invention the amount of reducible sulfur compound added to the oil to be dehydrogenated is decreased as the process period is continued, and in a further preferred embodiment the reducible sulfur compound is added to the oil to be dehydrogenated only during the first 1–50 hours of each process period or during an initial period not exceeding about ½ of the process period.

The process of the invention is applicable for the hydroforming of various hydrocarbon oils and fractions thereof, including pure hydrocarbons, regardless of their source. Thus, it may be advantageously applied when hydroforming oils which are substantially free of sulfur or contain merely traces of sulfur as well as when hydroforming oils containing appreciable amounts of sulfur impurities. In general the advantage of the present process over the prior practice is greatest when treating oils which normally contain less than about .25% sulfur, and gradually falls off as the concentration of sulfur normally present increases. Hydrocarbon oils containing up to about 1% sulfur can be advantageously treated, however.

Any of the conventional metal oxide dehydrogenation catalysts may be used. Thus, by way of example the catalyst may comprise as the predominating constituent an oxide of titanium, vanadium, chromium, manganese, iron, cobalt, nickel, copper, zinc, molybdenum, tungsten or cerium, and these may be combined with any of the conventional relatively inert carrier materials such as alumina, magnesia, zirconia, silica, bauxite or the like. The catalyst may furthermore be promoted with any of the conventional promoters such as platinum, potassium, silver, bismuth and thorium. The process of the invention is particularly advantageous when the catalyst comprises cobalt oxide. Thus, for example, it is particularly advantageous when the catalyst consists essentially of one of the following combinations of oxides: Co—Mo—Al, Co—Mo—Al—Si, Co—Mo—Al—Mg, Co—W—Al, Co—Cr—Al—Zn It is also particularly advantageous, although somewhat less so, when cobalt is replaced by nickel.

The present invention is only advantageous when the process is carried out at a temperature conducive to dehydrogenation, i. e., at a temperature of at least 825° F. At lower temperatures where hydrogenation is favored the described method offers no advantage. On the other hand, the temperature is preferably maintained below about 1025° F. to avoid excessive cracking. A small amount of cracking is often unavoidable, but large amounts of cracking are to be avoided.

The dehydrogenation is carried out in the presence of added hydrogen. As in the hydroforming process, the necessary hydrogen is provided by recycling part of the product gas to the reaction zone. The remainder of the product gas is withdrawn from the system. In general the concentration of hydrogen in the product gas is above 50%, but under some conditions where the net production of hydrogen is low it may fall to about 35% by volume. The amount of product gas recycled is sufficient to afford a partial pressure of at least 1 atmosphere in the reaction and preferably at least 10 atmospheres, e. g. 30–100 atmospheres. The total pressure may vary from about 2 atmospheres absolute up to several hundred atmospheres and is preferably in the range of about 25 to 75 atmospheres.

The liquid hourly space velocity (which is abbreviated L. H. S. V. and is defined as the volumes of hydrocarbon, measured as a liquid, passed in contact with the volume of catalyst bed in one hour) may be adjusted under the above described conditions of temperature and pressure to afford the desired degree of conversion. The L. H. S. V. may, therefore, vary widely. It is, however, usually between about 0.25 and 5.

According to the present invention, the dehydrogenation is improved, when carried out under the above conditions, by adding reducible sulfur to the hydrocarbon feed and simultaneously removing hydrogen sulfide from the product gas recycled to the dehydrogenation zone. By reducible sulfur is meant elemental sulfur or a sulfur compound which is reduced by hydrogen to give hydrogen sulfide under the described conditions. Any reducible sulfur compound may be used but the sulfur is preferably introduced in the form of an organic sulfur compound which is soluble in the oil and easily vaporized under the reaction conditions. Some of the more readily available and useful materials are, for instance, alkyl sulfides, alkyl disulfides, thiophenic sulfur compounds, mercaptans, carbonyl sulfide, carbon disulfide and elemental sulfur. The invention is, however, not limited to the use of these materials. Of the various classes or organic sulfur compounds all of which are converted to an appreciable extent to hydrogen sulfide under the described conditions, some classes give somewhat better results than others. The preferred types of sulfur compounds are the alkyl sulfides, the alkyl disulfides and thiophenic sulfur compounds. It is particularly to be pointed out that hydrogen sulfide, which is not reducible, does not afford the noted improvement in the process of the invention and is not equivalent. The sulfur does not need to be added to the feed in the form of a pure single compound but may be added in impure form or in various mixtures. Thus, various extracts or concentrates of sulfur compounds, for example such as those obtained in the "Solutizer" treating of sulfur bearing oils (see The Oil and Gas Journal 46, p. 145, April 1, 1948), may be used. Solutizer extract is particularly suitable since it consists largely of alkyl disulfides. It is often desirable to add a sulfur compound which boils outside of the boiling range of the desired product, thus allowing any unreacted sulfur compound to be easily separated from the desired product by fractional distillation.

The amount of sulfur added to the oil to be dehydrogenated is, in general, between about 0.1% and about 0.6% by weight regardless of the normal sulfur content of the original oil. However, larger and smaller amounts may advantageously be used in some cases depending upon the sulfur content of the original oil and the period of time during which the sulfur is added to the feed. Thus, when treating a material which normally contains only very small amounts of sulfur it is preferred to add somewhat larger amounts than when treating a material which normally contains relatively large amounts of sulfur. Also, when adding the sulfur during only a part of the process period larger amounts are generally used than when adding the sulfur during the total process period. Also, as will be further explained, it is desirable to add a relatively large amount of reducible sulfur at the start of the process period and to decrease the amount with time. The optimum amount of reducible sulfur to be added also depends somewhat upon the conditions of operation within the specified range and the character of the oil being dehydrogenated. In any case, an amount of reducible sulfur in the order of 0.1% to about 0.6% may be advantageously used and the concentration can then be adjusted during operation to give the optimum result.

As pointed out above, reducible sulfur is added to the hydrocarbon oil to be dehydrogenated and hydrogen sulfide is simultaneously removed from the product gas recycled to the dehydrogenation zone. As pointed out, the various sulfur compounds used are largely reduced to hydrogen sulfide in the reaction zone. The hydrogen sulfide thus produced distributes itself in the known manner between the condensed liquid product and the uncondensed product gas. Part of the product gas is removed from the system and the remainder is recycled to the dehydrogenation zone to supply the required hydrogen. The hydrogen sulfide may be removed from the recycled stream of product gas by any of the known methods. A practical method is to extract it by scrubbing the recycled product gas with a suitable alkali, as, for example, in the well known Shell Phosphate Process (see Refiner and Natural Gasoline Manufacturer, 20, page 116, September 1941). This process produces a product gas containing only a very small amount of residual hydrogen sulfide. It is desirable to free the recycled product gas substantially of hydrogen sulfide, but residual hydrogen sulfide concentrations up to about 1% can be tolerated.

In one modification of the present invention, reducible sulfur is added to the initial hydrocarbon oil to be dehydrogenated and the doctored feed is then passed to the dehydrogenation reaction zone throughout each process period while removing hydrogen sulfide from the product gas recycled to the dehydrogenation zone.

In a preferred modification of the invention, the amount of sulfur added to the feed is reduced with time during each process period. Thus, the concentration of added sulfur is reduced intermittently or continuously during each process period.

The maximum increase in the length of the process period is obtained, however, when the feed is doctored only during the initial part of each process period and the process period is then continued without further addition of sulfur. Thus, in this preferred embodiment of the invention, the reducible sulfur is added to the feed only during the first ½ of each process period, e. g., the first 2-50 hours and each process period is then continued with the undoctored feed.

The following experimental data will be of help in understanding the invention.

Example I

Substantially pure methyl cyclohexane containing only a trace of sulfur was dehydrogenated under the following mild conditions Temperature _____ 510° C.
Pressure _____ 700 p. s. i. g.
L. H. S. V. _____ 1
H₂ _____ 5000 cu. ft. per barrel The hydrogen gas used was substantially free of hydrogen sulfide. The following catalysts were used.

3905-587—Alorco H40 alumina gel impregnated with molybdenum oxide (9.3% Mo).
WC-126b—Alorco H40 alumina gel impregnated with molybdenum oxide and cobalt oxide (9.5% Mo, 1.5% Co).
W-3239—Kellogg Company "low soda" hydroforming catalyst. (Impregnated type molybdena-alumina catalyst.)
W-3242—Standard Oil Co. of California "Oronite" hydroforming catalyst (precipitated type molybdena-alumina catalyst).
3905-594—British Guiana bauxite impregnated with molybdenum oxide (10% Mo).

In each case 0.5% sulfur as propyl sulfide was added to the feed during the first ten hours of each process period while excluding hydrogen sulfide in the gas; the process period was then continued for at least twenty additional hours. The weight per cents toluene in the liquid products during the second ten hours and last ten hours of the process periods are shown in the following table.

| Catalyst | Per Cent b. w. Toluene | |
|---|---|---|
| | 2nd ten hours | last ten hours |
| 3905-587 | 42.3 | 40.8 |
| WC-126b | 49.2 | 41.3 |
| W-3239 | 49.1 | 46.7 |
| W-3242 | 35.2 | 25.2 |
| 3905-594 | 52.5 | 47.7 |

It will be noted that in each case the rate of decline in activity of the catalyst was relatively low, thus allowing an extended process period.

Example II

A narrow boiling fraction from a straight-run gasoline (Ex Los Angeles Basin Petroleum) having the following inspection data was dehydrogenated.

Boiling range _____ 290-400° F.
Aromatics _____ 15.7% estimated
Naphthenes _____ 68.8% estimated
Paraffins _____ 13.6% estimated
Olefins _____ 1.9% estimated
Sulfur _____ 0.116% by analysis The dehydrogenation was carried out under the following conditions:

Temperature, 510° C.
Pressure, 700 lbs. per square inch gage
L. H. S. V., 1.05 and 1.50
Hydrogen, 5000 cu. ft. per barrel, free of H₂S The catalyst was prepared by impregnating Alorco H40 alumina gel with molybdenum oxide (ca 9.3% Mo). The batches of the catalyst were heated to the reaction temperature in about one hour in a stream of hydrogen; the pressure was then imposed and the system was held for one-half hour at the desired temperature and hydrogen flow rate before initiating the process period. The liquid product was analyzed for paraffins, olefins, naphthenes and aromatics, using a sulfuric acid absorption method for determining the aromatics and the refraction intercept method for determining the napthenes. Values for the olefins were obtained from the bromine numbers; paraffins were determined by difference. From these analyses together with a hydrogen analysis on the liquid product and feed it was possible to obtain a hydrogen balance for each of the runs. In the first case this feed was dehydrogenated in the usual way. In the second case a feed containing added normal propyl sulfide (0.5% sulfur) was dehydrogenated for the first ten hours of the process period, after which the process period was continued with the described feed (L. H. S. V.=1.5). The process period in this latter case was over 2.5 times of that of the first case. The results are shown in the following table. These results are not for the total process period in the second case but for the last part of the process period where the sulfur concentrations in the feed were the same.

|  | First Case | Second Case |
|---|---|---|
| Per cent by weight carbon on catalyst at end of process period | 5.0 | 3.4 |
| Per cent by weight sulfur on catalyst at end of process period | 1.4 | 2.5 |
| Per cent by weight butane and lighter products produced, no loss basis | 30.8 | 17.7 |
| Per cent by weight liquid product | 69.2 | 82.3 |
| Liquid volume recovery, per cent aromatics produced, per cent b. w | 69.2 | 82.0 |
| No loss basis | 42.8 | 46.5 |
| Hydrogen Production, cu. ft./bbl | −97 | +430 |
| Liquid product analysis: |  |  |
| Aromatics | 61.9 | 56.5 |
| Naphthenes | 8.2 | 11.2 |
| Paraffins | 29.0 | 30.8 |
| Olefins | 0.9 | 1.5 |

The marked improvement is evident. Thus, even after multiplying the process period 2½ times the catalyst at the end of the process period contains only about 70% as much carbonaceous deposits (3.4% carbon against 5% carbon). The suppression of the side reactions is also evident in the great difference in the hydrogen production. That the noted results are not due to a general decline in the activity of the catalyst is evident from the hydrogen production and also from the production of aromatics. Thus, while the per cent of aromatics in the liquid product was slightly higher in the normal operation, this was due to some concentration of the aromatics by the cracking of non-aromatic constituents and not to any better dehydrogenation. When the amount of liquid product is also taken into consideration, it is seen that the production of aromatics by dehydrogenation of the naphthenes in the feed was increased about 8%, even in this latter part of the process period. This increase is not due to any promoting of the dehydrogenating activity of the catalyst by the n-propyl sulfide added during the first ten hours of the process period, but is due to a decreased rate of decline in the activity of the catalyst. It will be noted that the use of the feed containing n-propyl sulfide during the first ten hours of the process period is also reflected in the sulfur contents of the catalyst. It is believed that the 2.5% sulfur in the second case is largely in the form of one or more organic sulfur compounds.

*Example III*

The application of the method of the invention is also illustrated in the dehydrogenation of the same feed stock with other catalysts under the same conditions described above, in Example II. As in the above example, n-propyl sulfide was added to the feed (0.5% sulfur) during the first ten hours of processing, after which the above-described hydrocarbon fraction was dehydrogenated. For the sake of comparison experiments with three different, although similar, catalysts are chosen. These catalysts were as follows:

*Catalyst W-3242.*—This was the same commercial co-precipitated molybdena-alumina gel catalyst produced by the Standard Oil Company of California.

*Catalyst No. W-3239.*—This was the same commercial impregnated type molybdena-alumina hydroforming catalyst produced by the M. W. Kellogg Company.

*Catalyst No. 3905-595.*—This catalyst was prepared by impregnating a commercial stabilized alumina gel (Unigel-X produced by the Harshaw Chemical Company) with ammonium molybdate followed by calcining.

The results obtained are given in the following table:

|  | Catalyst | | |
|---|---|---|---|
|  | W-3242 | W-3239 | 3905-595 |
| Per cent by weight carbon on catalyst at end of process period | 3.7 | 1.9 | 5.0 |
| Per cent by weight sulfur on catalyst at end of process period | 2.3 | 2.3 | 2.6 |
| L. H. S. V | 1 | 1 | 1 |
| Per cent by weight butane and lighter products, no loss basis | 19.4 | 14.6 | 16.8 |
| Liquid product analysis: |  |  |  |
| Aromatics | 55.6 | 49.3 | 52.3 |
| Naphthenes | 12.0 | 18.8 | 12.9 |
| Paraffins | 30.8 | 30.2 | 32.7 |
| Olefins | 1.6 | 1.7 | 2.1 |
| Hydrogen Production, cu. ft./bbl | +236 | +204 | +342 |

It will be noted, however, that the catalyst No. W-3239 had a somewhat lesser tendency to produce carbon and that the catalyst No. 3205-595 had a considerably greater tendency to produce carbon. In all cases, however, the process period could be appreciably extended before it became necessary to regenerate the catalyst.

*Example IV*

The same straight-run hydrocarbon fraction containing 0.116% sulfur was dehydrogenated under the same conditions, namely, temperature 510° C., pressure 700 lbs. per square inch gage, L. H. S. V. 1, hydrogen 5000 cu. ft. per barrel with a molybdena-alumina catalyst (ca. 13% Mo) prepared by impregnating the above-mentioned commercial alumina gel (Alorco H40) with ammonical ammonium molybdate under vacuum.

In another case, the same catalyst was used under the same conditions for ten hours with a feed to which 0.5% sulfur was added as normal propyl sulfide and then the process period was continued for four hours with the hydrocarbon fraction to which no sulfur was added. In this case, the dehydrogenation during the last four hours of the process periods was the same within experimental error. The yield of liquid product was, however, improved 68.0% vs. 64.4%. For purposes of the investigation the process period was cut short at four hours after discontinuing the use of doctored feed. In practice, however, the process period would be continued considerably prior to regeneration.

Example V

A straight-run hydrocarbon fraction having the following inspection data

| | |
|---|---|
| Specific gravity 60/60° F | 0.778 |
| Bromine No. | 0 |
| Aromatics per cent by weight | 16.6 |
| Sulfur per cent by weight | 0.006 |
| ASTM Distillation: | |
|   IBP °F | 260 |
|   EP °F | 347 |
|   10% °F | 270 |
|   50% °F | 282 |
|   90% °F | 318 | was dehydrogenated with a catalyst prepared with the above-described commercial alumina gel (Alorco H40). The catalyst had the following analysis.

| | Per cent |
|---|---|
| Aluminum | 40.3 |
| Silicon | 2.4 |
| Cobalt | 1.4 |
| Molybdenum | 9.65 |
| Sulfur | less than 0.05 |

The hydrogen gas employed analyzed as follows:

| | Mol per cent |
|---|---|
| Nitrogen | 0.68 |
| Carbon monoxide | 0.40 |
| Hydrogen | 97.42 |
| Methane | 0.42 |
| Ethane | 0.27 |
| Propane | 0.54 |
| Butane | 0.27 |
| Hydrogen sulfide | Trace |

The dehydrogenation conditions were as follows:

Temperature, 950° F.
Pressure, 700 lbs. per sq. in., gage
L. H. S. V., 1
Hydrogen gas, 5000 cu. ft. per barrel In one case the feed was dehydrogenated under the described conditions in the usual manner without added sulfur. The process period could not be extended to more than a few hours.

In a second case no sulfur was added to the feed but the catalyst was pretreated at 650° F. and 1 atmosphere pressure with hydrogen sulfide for one hour. The pretreatment did not improve the rate of decline of the rate of activity of the catalyst, and moreover materially decreased the initial dehydrogenation activity of the catalyst.

In a third case various amounts of sulfur in the form of ethyl mercaptan were added to the feed throughout the total processing period. This did not cause marked poisoning of the catalyst as in the case of the hydrogen sulfide pretreated catalyst, but the activity of the catalyst declined at about the same rate.

In a fourth case 0.15% sulfur in the form of ethyl mercaptan was added to the feed during the first 24 hours of operation and then the process period was continued to a total of 485 hours with no appreciable loss in activity. The substantial improvement obtained when operating according to this method will be evident upon inspection of the attached drawing wherein the dehydrogenation (expressed in terms of the aromatic production in weight per cent of the feed treated) is plotted against the hours on stream during a single process period. Referring to the graph in the drawing, the three curves show the extent of dehydrogenation and the rate of decline of the catalytic activity in the second, third and fourth cases just described.

In the above example a simulated recycle gas rich in hydrogen and substantially free of hydrogen sulfide was supplied to the reaction zone. It is to be pointed out that it is important that the hydrogen sulfide be removed from the recycle gas. If it is not removed the catalyst is subjected to what amounts to a pretreatment with hydrogen sulfide. It has been definitely shown that this is detrimental. Thus, the present method of operation is not merely a means of presulfiding the catalyst. The effect of hydrogen sulfide on the catalyst is illustrated in the following examples.

Two molybdena catalysts were used for the dehydrogenation of pure methylcyclohexane under dehydrogenation conditions. One catalyst was prepared by impregnating a stabilized gel (Alorco H40 alumina) with molybdenum oxide (ca. 10% Mo); the other was a commercial co-precipitated molybdena-alumina gel type catalyst (ca. 6% Mo). These catalysts were employed after the conventional preliminary treatment with hydrogen, and also after the same pretreatment plus various pretreatments with hydrogen sulfide. It was found that both catalysts were markedly deactivated when presulfided in this way to a sulfur content greater than about 1–2%.

This important effect is further illustrated in experiments in which different types and conditions of partial sulfiding of the catalyst were tried. In one group of experiments the catalysts were prepared by impregnating the above-mentioned commercial alumina gel with an ammonium molybdate solution containing known amounts of hydrogen sulfide. The resulting products were dried in hydrogen. In a second group the above-mentioned commercial coprecipitated molybdena-alumina gel catalyst was pretreated for one-half hour with hydrogen sulfide at temperatures of 125, 300 and 350° C. The details of the preparation and treatment of the catalyst follow.

*Catalyst No. 585.*—One hundred grams of Alorco H40 alumina was impregnated with 70 cc. of a solution containing twenty-one grams of ammonium molybdate, 28.6 grams ammonia and 5.2 grams of hydrogen sulfide. The temperature of the impregnating solution was 50–60° C. After surface drying, the product was treated with hydrogen (0.025 cu. ft. per minute) for three hours at 300° C. The resulting catalyst contained 3.6% sulfur.

*Catalyst No. 586.*—This catalyst was prepared as catalyst No. 585 except that the impregnating solution contained 8 grams hydrogen sulfide. The resulting catalyst contained 5.8% sulfur.

*Catalyst No. 588.*—Sixty-two cc. of the commercial catalyst (M. W. Kellogg Co. No. D–1618H) was placed in a Pyrex tube and treated for one-half hour with 0.036 cu. ft. per minute of hydrogen sulfide. The temperature was initially 190° C. but increased to 224° C. due to the exothermic heat of the reaction. The resulting catalyst contained 4.8% sulfur.

*Catalyst No. 589.*—This catalyst was treated in the same manner as catalyst No. 588 except that the treatment with hydrogen sulfide was carried out at 330–380° C. The resulting catalyst contained 3.6% sulfur.

*Catalyst No. 590.*—This catalyst was treated in the same manner as catalyst No. 588 except that the treatment with hydrogen sulfide was carried out at 100–150° C. The resulting catalyst contained 3.3% sulfur.

Each of these catalysts was used for the dehydrogenation of pure methylcyclohexane under the following typical dehydrogenating conditions. Temperature, 510° C.; pressure, 700 lbs. per sq. inch, gage; L. H. S. V., 1; hydrogen, 5000 cu. ft. per barrel. The dehydrogenation activities of the catalyst expressed in terms of the per cent by weight of toluene in the liquid product at 2, 4 and 6 hours on stream are shown in the following table:

| Catalyst Nos. | Per Cent Toluene Hrs. on stream | | |
|---|---|---|---|
| | 2 hrs. | 4 hrs. | 6 hrs. |
| 585 | 19.5 | 16.1 | 13.1 |
| 586 | 21.8 | 19.6 | 14.6 |
| 590 | 18.4 | 14.1 | 11.9 |
| 588 | 15.7 | 10.4 | 8.2 |
| 589 | 18.3 | 16.0 | 12.5 |

It will be noted that whereas a catalyst containing fairly large amounts of sulfur deposited from organic sulfur compounds is still fairly active, even quite small amounts of sulfur in the form of metal sulfides exert a very detrimental effect on the activity of the catalyst. Only a small amount of metal sulfide sulfur can be tolerated.

I claim as my invention:

1. In a process for the catalytic dehydrogenation of a normally liquid hydrocarbon oil containing in the order of 0.1% to 0.25% sulfur wherein the said hydrocarbon oil to be dehydrogenated is passed through a dehydrogenation reaction zone under dehydrogenation conditions of temperature and pressure in contact with a fixed bed of a metal oxide dehydrogenation catalyst in the presence of at least ten atmospheres partial pressure of recycled product gas rich in hydrogen for a period of time substantially in excess of 50 hours called the process period, and wherein the activity of the said metal oxide dehydrogenation catalyst is restored after each such process period by burning combustible deposits therefrom during a so-called regeneration period, the improvement which comprises adding between 0.1% and 0.6% of elemental sulfur to said hydrocarbon oil to be dehydrogenated during the first 2–50 hours only of each process period, commingling said feed with at least ten atmospheres partial pressure of recycled product gas and passing the mixture through said reaction zone in contact with a cobalt oxide-molybdenum oxide dehydrogenation catalyst, cooling the reaction mixture, separating product gases containing hydrogen and hydrogen sulfide from liquid product, removing hydrogen sulfide to a concentration below 1% from at least a portion of said separated product gas and recycling only the said portion of product gas from which the hydrogen sulfide was removed to the said dehydrogenation reaction zone to supply said partial pressure, whereby the ratio of the process period to the regeneration period is increased.

2. In a process for the catalytic dehydrogenation of a normally liquid hydrocarbon oil containing less than 0.25% sulfur wherein the said hydrocarbon oil to be dehydrogenated is passed through a dehydrogenation reaction zone under dehydrogenation conditions of temperature and pressure in contact with a fixed bed of a metal oxide dehydrogenation catalyst in the presence of at least 10 atmospheres partial pressure of recycled product gas rich in hydrogen for a period of time substantially in excess of 50 hours, called the process period, and wherein activity of the said metal oxide dehydrogenation catalyst is restored after each such process period by burning combustible deposits therefrom during a so-called regeneration period, the improvement which comprises adding between 0.1% and 0.6% of elemental sulfur to said hydrocarbon oil to be dehydrogenated during the first 2–50 hours only of each process preiod, commingling said feed with at least 10 atmospheres partial pressure of recycled product gas and passing the mixture through said reaction zone in contact with a cobalt oxide-molybdenum oxide dehydrogenation catalyst, cooling the mixture, separating the product gases containing hydrogen and hydrogen sulfide from liquid product, removing hydrogen sulfide to a concentration below 1% from at least a portion of said separated product gas and recycling only the said portion of said product gas from which the hydrogen sulfide was removed to the said dehydrogenation reaction zone to supply said partial pressure, whereby the ratio of the process period to the regeneration is increased.

3. In a process for the catalytic dehydrogenation of a normally liquid hydrocarbon oil containing less than 0.25% sulfur wherein the said hydrocarbon oil to be dehydrogenated is passed through a dehydrogenation reaction zone under dehydrogenation conditions of temperature and pressure in contact with a fixed bed of a metal oxide dehydrogenation catalyst in the presence of at least 10 atmospheres partial pressure of recycled product gas rich in hydrogen for a period of time substantially in excess of 50 hours, called the process period, and wherein activity of the said metal oxide dehydrogenation catalyst is restored after each such process period by burning combustible deposits therefrom during a so-called regeneration period, the improvement which comprises adding between 0.1% and 0.6% of sulfur in the form of a reducible sulfur compound to said hydrocarbon oil to be dehydrogenated during the first 2–50 hours only of each process period, commingling said feed with at least 10 atmospheres partial pressure of recycled product gas and passing the mixture through said reaction zone in contact with a cobalt oxide-molybdenum oxide dehydrogenation catalyst, cooling the mixture, separating the product gases containing hydrogen and hydrogen sulfide from liquid product, removing hydrogen sulfide to a concentration below 1% from at least a portion of said separated product gas and recycling only the said portion of said product gas from which the hydrogen sulfide was removed to the said dehydrogenation reaction zone to supply said partial pressure, whereby the ratio of the process period to the regeneration is increased.

4. In a process for the catalytic dehydrogenation of a normally liquid hydrocarbon oil containing less than 0.25% sulfur wherein the said hydrocarbon oil to be dehydrogenated is passed through a dehydrogenation reaction zone under dehydrogenation conditions of temperature and pressure in contact with a fixed bed of a metal oxide dehydrogenation catalyst in the presence of at least 10 atmospheres partial pressure of recycled product gas rich in hydrogen for a period of time substantially in excess of 50 hours, called the process period, and wherein activity of the said metal oxide dehydrogenation catalyst is restored after each such process period by burning combustible deposits therefrom during a so-called regeneration period, the improvement which comprises adding between 0.1% and 0.6% of elemental sulfur to said hydrocarbon oil to be dehydrogenated during the first 2-50 hours only of each process period, commingling said feed with at least 10 atmospheres partial pressure of recycled product gas and passing the mixture through said reaction zone in contact with a metal oxide dehydrogenation catalyst, cooling the reaction mixture, separating the product gases containing hydrogen and hydrogen sulfide from liquid product, removing hydrogen sulfide to a concentration below 1% from at least a portion of said separated product gas and recycling only the said portion of said product gas from which the hydrogen sulfide was removed to the said dehydrogenation reaction zone to supply said partial pressure, whereby the ratio of the process period to the regeneration is increased.

5. In a process for the catalytic dehydrogenation of a normally liquid hydrocarbon oil containing less than 0.25% sulfur wherein the said hydrocarbon oil to be dehydrogenated is passed through a dehydrogenation reaction zone under dehydrogenation conditions of temperature and pressure in contact with a fixed bed of a metal oxide dehydrogenation catalyst in the presence of at least 10 atmospheres partial pressure of recycled product gas rich in hydrogen for a period of time substantially in excess of 50 hours, called the process period, and wherein activity of the said metal oxide dehydrogenation catalyst is restored after each such process period by burning combustible deposits therefrom during a so-called regeneration period, the improvement which comprises adding between 0.1% and 0.6% of sulfur in the form of a reducible sulfur compound to said hydrocarbon oil to be dehydrogenated during the first 2-50 hours only of each process period, commingling said feed with at least 10 atmospheres partial pressure of recycled product gas and passing the mixture through said reaction zone in contact with a metal oxide dehydrogenation catalyst, cooling the reaction mixture, separating the product gases containing hydrogen and hydrogen sulfide from liquid product, removing liquid product, removing hydrogen sulfide to a concentration below 1% from at least a portion of said separated product gas and recycling only the said portion of said product gas from which the hydrogen sulfide was removed to the said dehydrogenation reaction zone to supply said partial pressure, whereby the ratio of the process period to the regeneration is increased.

RICHARD A. BANNEROT.

REFERENCES CITED

The following references are of record in the file of this patent:

UNITED STATES PATENTS

| Number | Name | Date |
|---|---|---|
| 2,137,275 | Ellis | Nov. 22, 1938 |
| 2,367,348 | Harrington | Jan. 16, 1945 |
| 2,403,052 | Cole et al. | July 2, 1946 |
| 2,416,894 | Barron | Mar. 4, 1947 |

FOREIGN PATENTS

| Number | Country | Date |
|---|---|---|
| 543,968 | Great Britain | Mar. 23, 1942 |
| 553,705 | Great Britain | June 2, 1943 |